(12) United States Patent
Kuroi

(10) Patent No.: US 6,496,279 B2
(45) Date of Patent: *Dec. 17, 2002

(54) IMAGE PROCESSING APPARATUS, METHOD AND MEMORY MEDIUM THEREFOR

(75) Inventor: Yoshinobu Kuroi, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,019

(22) Filed: Jul. 29, 1998

(65) Prior Publication Data

US 2002/0159079 A1 Oct. 31, 2002

(30) Foreign Application Priority Data

Jul. 30, 1997 (JP) ............................................... 9-218319

(51) Int. Cl.[7] ............................................... B41B 19/00
(52) U.S. Cl. ....................... 358/1.9; 358/1.14; 358/437; 358/444; 358/468
(58) Field of Search ............................. 358/1.15, 1.16, 358/1.9, 149, 437, 444, 448, 442, 471, 404, 1.17, 1.14, 468

(56) References Cited

U.S. PATENT DOCUMENTS

| | | | | | |
|---|---|---|---|---|---|
| 5,108,207 | A | * | 4/1992 | Isobe et al. | 400/70 |
| 5,337,258 | A | * | 8/1994 | Dennis | 364/551.01 |
| 5,854,693 | A | * | 12/1998 | Yoshiura et al. | 358/468 |
| 5,964,851 | A | * | 10/1999 | Ueda | 710/17 |
| 5,995,718 | A | * | 11/1999 | Hiraike et al. | 395/110 |
| 6,052,202 | A | * | 4/2000 | Shimizu | 358/1.16 |
| 6,175,426 | B1 | * | 1/2001 | Hirooka | 358/1.9 |

* cited by examiner

Primary Examiner—Thomas D. Lee
(74) Attorney, Agent, or Firm—Fitzpatrick, Cella, Harper & Scinto

(57) ABSTRACT

There is provided an information processing system capable of always ensuring output with a predetermined number of output sheets, and an information processing method and a recording medium therefor. A printer control system is composed of a host computer on which a printer driver constituting a printer control command generating program is operable, and a printer capable of processing the data as if the data have been received by a designated number of times, wherein the host computer is provided with an external memory for temporarily storing the maximum data amount of the received data temporarily storable in the printer, and a printer driver for discriminating whether the total data size of the printer control commands exceeds the maximum data amount, and, in case of excess, outputting the temporarily stored printer control commands by a designated number of times to the printer.

40 Claims, 8 Drawing Sheets

IMAGE PROCESSING APPARATUS, METHOD AND MEMORY MEDIUM THEREFOR

BACKGROUND OF THE INVENTION

1. Field of the Invention

The present invention relates to an information processing system, an information processing method and a memory medium therefor, and more particularly an information processing system adapted for use in a system consisting of a host computer and a printer connected thereto, and a method and a memory medium therefor.

2. Related Background Art

Conventionally there is known a system which consists of a host computer and a printer connected thereto and in which printing is executed by transmitting print data from the host computer to the printer. In such system, by transmitting the print data from the host computer to the printer plural times, it is possible to stack the output sheets, on a sheet discharge unit provided in the printer, by the number of transmissions (hereinafter called multiple-copy output). In such process, however, the load of data communication between the host computer and the printer inevitably increases in proportion to the number of transmission.

On the other hand, some recent printers have the function of temporarily storing the received data in specified memory means and executing the operation as if the data have been received by the designated number of times. Such function allows to realize the multiple-copy output described above by a communication load of transmitting the print data of about one time to the printer. In case of the multiple-copy output with the above-described printer function, the conventional printer driver functioning on the host computer always adds, to the ordinary printer control commands, a printer control command for designating the number of repetition of the process on the data received by and temporarily stored in the printer.

However, the above-described conventional technology has been associated with the following drawback. As the total data size of the printer control commands generated by the printer driver cannot be generally known until the end of the command generating process, such total data size of the printer control commands may exceed the maximum data size temporarily storable in the printer. Consequently the multiple-copy output based on the above-described printer function is not necessarily always ensured.

SUMMARY OF THE INVENTION

In consideration of the foregoing, the object of the present invention is to provide an information processing system capable of always ensuring the result of predetermined multiple-copy output, and an information processing method and a memory medium therefor.

The above-mentioned object can be attained, according to the present invention, by an information processing system including an upper equipment such as a computer on which a command generating program for generating the print control commands is operable and a printing device such as a printer for effecting printing based on the data received from the upper equipment, the system comprising command memory means for temporarily storing the print control commands, discrimination means for discriminating whether the total data size of the temporarily stored print control commands exceeds the maximum data size of the received data temporarily storable in the printing device, and output means adapted, in case of excess, to output the temporarily stored print control commands by a designated number of times to the printing device, or an information processing method of a memory medium therefor.

The present invention is also featured in that the printing device includes received data memory means for temporarily storing the received data from the upper equipment and is capable of execution as if such data have been received by the designated number of times.

The present invention is also featured in that the upper equipment includes data size memory means for memorizing the maximum data size.

The present invention is also featured in that the data size memory means is attachable to and detachable from the upper equipment.

The present invention is also featured in that the maximum data size is memorized through a user interface of the command generating program.

The present invention is also featured in that the maximum data size is memorized by a program module other than the command generating program.

The present invention is also featured in that the printing device includes data size memory means for memorizing the maximum data size, and the upper equipment includes acquisition means for acquiring the maximum data size from the data size memory means.

The present invention is also featured in that the data size memory means is attachable to and detachable from the printing device.

The present invention is also featured in that the acquisition means is adapted to acquire the maximum data size through a bidirectional interface or a network.

DESCRIPTION OF THE PREFERRED EMBODIMENTS

Figure 1:
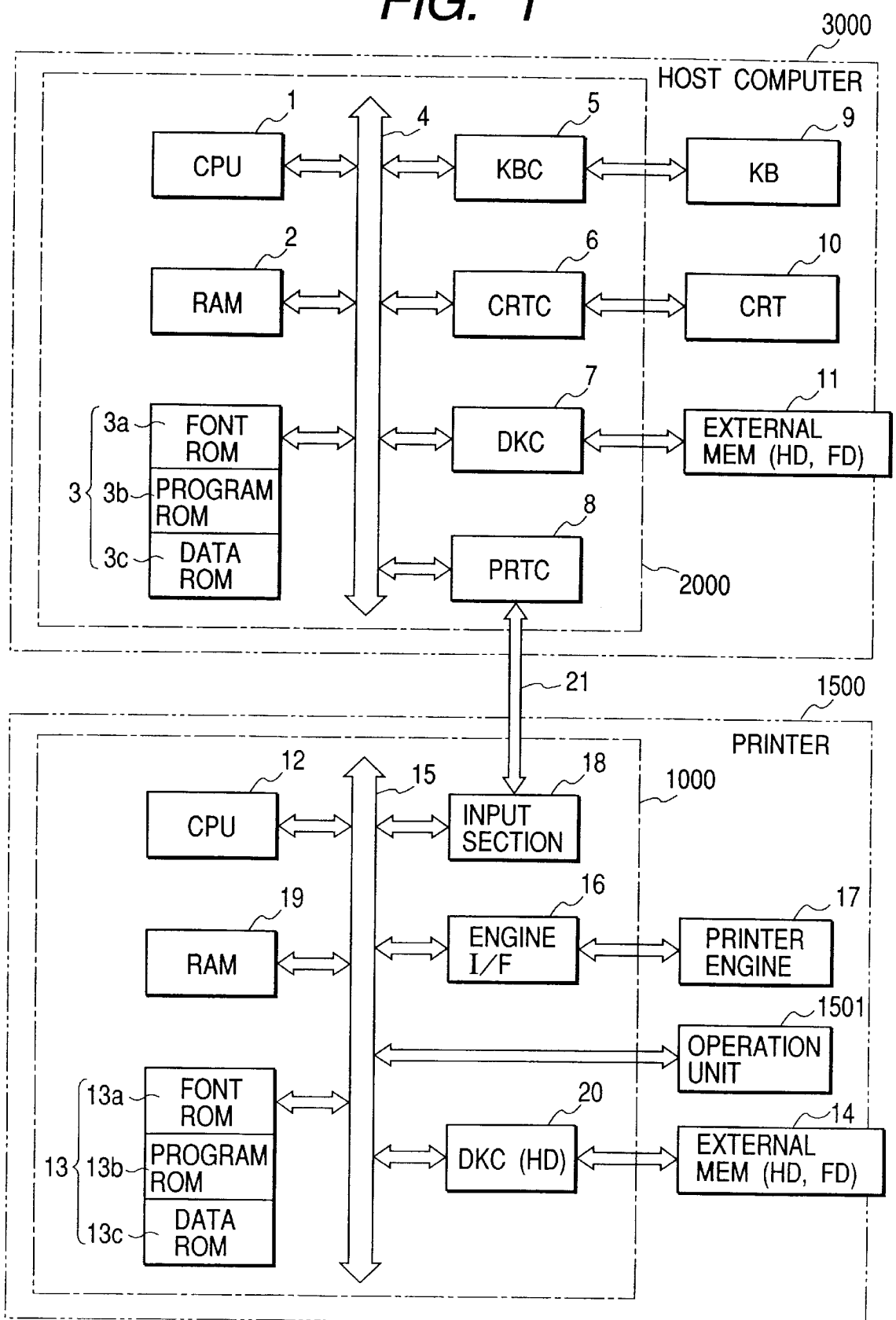
FIG. 1 is a block diagram showing the entire configuration of a printer control system constituting first and second embodiments of the present invention.

Now the present invention will be clarified in detail by preferred embodiments, with reference to the attached drawings.

[1] First embodiment

At first there will be explained, with reference to a block diagram in FIG. 1, the configuration of a printer control system constituting a first embodiment of the present invention. The present invention is naturally applicable to a single equipment, a system consisting of plural equipments, or a system connected and executing operations through a network such as LAN (local area network) or WAN (wide area network), as long as the functions of the present invention can be realized.

As a commercial product, the present invention can also be realized as a FD (floppy disk), a CD-ROM (compact disk ROM), or a BBS (bulletin board system; a computer-based message exchange system) such as Internet Web Site or Nifty Serve. In such case, the program of the present invention can be supplied to the printer control system from the FD or the CD-ROM or through the Internet or the Nifty Serve connected to the system.

The printer control system of the first embodiment is composed of a host computer 3000 and a printer 1500. The host computer 3000 is provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11. The printer 1500 is provided with a CRU 12, a RAM 19, a ROM 13, an input unit 18, a printer interface (I/F) 16, a disk controller (DKC) 20, a printer engine 17, an operation unit 1501, and an external memory 14.

At first there will be explained the configurations of various units of the host computer 3000. The central processing unit (CPU) 1, collectively controlling the devices connected to a system bus 4, executes document processing including graphics, images, characters, tables (including table calculations) etc. based on a document processing program stored in a program ROM 3b (explained later) of the ROM 3. The CPU 1 also executes development (rasterization) of outline font into a display information RAM defined on the RAM 2, thereby enabling WYSIWYG (what you see is what you get) function on the CRT display 10.

Furthermore, the CPU 1 opens various registered windows based on commands designated by a mouse cursor (not shown) or the like on the CRT display 10, thereby executing various data processings. In executing the printing operation with the printer 1500, the user can set the printing process for the printer driver, including the setting of the printer 1500 and the selection of the printing mode, by opening a window relating to the setting of the printing operation.

The RAM 2 functions as a main memory and a work area for the CPU 1. The ROM 3 is provided with a font ROM 3a, a program ROM 3b, and a data ROM 3c. The font ROM 3a or the external memory 11 stores the font data etc. employed in the document processing mentioned above. The program ROM 3b or the external memory 11 stores an operation system (OS) program which is the control program of the CPU 1. The data ROM 3c or the external memory 11 stores various data (for example directory information, printer driver table etc.) employed in the above-mentioned document processing.

The control on the hardware is governed by the CPU 1. On the other hand, the control on the software is governed by an application software called printer control command generating program (hereinafter called printer driver). In the first embodiment, the operating system is assumed for example as the Windows 95 (manufactured by Microsoft), but such selection is not restrictive.

The keyboard controller (KBC) 5 controls the key input from the keyboard 9 or the pointing device (not shown). The CRT controller (CRTC) 6 controls the display on the CRT display 10. The disk controller (DKC) 7 controls the access to the external memory 11. The printer controller (PRTC) 8 is connected to the printer 1500 through the bidirectional interface 21, and executes the communication control with the printer 1500. The keyboard 9 is provided with various keys.

The CRT display (CRT) 10 displays graphics, images, characters, tables etc. The external memory 11 is composed for example of a hard disk (HD) or a floppy disk (FD) and stores a boot program, various applications, font data, user files, editing files, printer control command generating program etc.

The CPU 1, RAM 2, ROM 3, keyboard controller (KBC) 5, CRT controller (CRTC) 6, disk controller (DKC) 7, and printer controller (PRTC) 8 are provided on a computer control unit 2000.

In the following there will be explained the various units of the printer 1500. The central processing unit (CPU) 12 collectively controls various devices connected to a system bus 15, and supplies the printer engine 17 with an output image signal, based on a control program stored in the program ROM 13b (explained later) of the ROM 13 or a control program stored in the external memory 14. Also the CPU 12 is capable of communication with a host computer 3000 through the input unit 18, thereby informing the host computer 3000 of the information of the printer 1500.

The RAM 19 functions as a main memory or a work area of the CPU 12 and can expand the memory capacity by an optional RAM (not shown) connected to an expansion port. The RAM 19 is used as an output information developing area, an environmental data storage area and an NVRAM. The ROM 13 is provided with a font ROM 13a, a program ROM 13b and a data ROM 13c. The font ROM 13a is used for storing the font data etc. employed for generating the output information mentioned above. The program ROM 13b stores control program etc. for the CPU 12. The data ROM 13c stores the information utilized on the host computer 3000 in case the external memory 14 such as a hard disk is not connected to the printer 1500.

The input unit 18 executes data exchange between the printer 1500 and the host computer 3000 through the bidirectional interface 21. The printer engine interface (I/F) 16 executes data exchange between the CPU 12 and the printer engine 17. The disk controller (DKC) 20 controls the access to the external memory 14. The printer engine 17 executes the printing operation under the control of the CPU 12. The operation unit 1501 is provided with switches for various operations and display means such as an LED display unit.

The external memory 14 is composed for example of a hard disk (HD) or an IC card, and is connected as an option to the printer 1500. The external memory 14 is used for storing font data, an emulation program, form data etc., and is access controlled by the disk controller (DKC) 20.

The external memory 14 is not limited to one unit but may be provided in plural units. Thus the printer 1500 may be connected to a plurality of an optional font card, an external memory storing a program for interpreting a printer control language of a different language system, in addition to the internal fonts. Also there may be provided an NVRAM (not shown) for storing the printer mode setting information from the operation unit 1501.

The CPU 12, RAM 19, ROM 13, input unit 19, printer engine interface 16, and disk controller 20 are provided on a printer control unit 1000.

The printer 1500 of the printer control system of the first embodiment is further provided with a function (hereinafter called job spool function) of, in case of receiving a specified printer control command, not immediately processing the data received thereafter but temporarily storing such data in memory means such as the RAM 19 and handling such data as if such data has been consecutively received for a designated number of times. The above-mentioned printer control command is formatted as follows:

@PJL JOBSPOOL CPIES=num ENDSTRING=
"word"<CR><LF>    (1)

wherein num: number indicating the number of times of consecutive processing of the temporarily stored data;

word: character train indicating the end of print data;

<CR>: carriage return characters

<LF>: line feed characters.

Upon receiving the above-mentioned command, the printer 1500 stores data starting immediately after the command and ending immediately before the character train "word" in the RAM 19. The storable data amount is limited to a capacity set in advance in the printer 1500, and the capacity can be changed by changing the setting by a predetermined method through the operation unit 1501 or by transmitting a printer control command of a similar effect to the printer 1500 thereby restarting the same.

The above-mentioned capacity set on the printer 1500 can be informed to the host computer 3000 in case of an information acquisition request by a specified printer control command. After the spooling operation, the printer 1500 processes the data stored in the RAM 19 in succession as if such data have been received by a number of times designated by "num" in the above-mentioned command. Such function allows to stack the output sheets by a number designated by "word" on the sheet discharge unit provided on the printer 1500.

In the first embodiment, it has been explained that, upon receiving the above-mentioned command, the printer 1500 stores the received data in the RAM 19, but such data may also be stored in arbitrary memory means such as the external memory 14 provided in the printer 1500, or such memory means may be utilized in combination.

In the host computer 3000 of the printer control system of the first embodiment, a BIOS (basic input output system: program executing most basic processes required in the interfaces of input/output devices), an operating system, applications and a printer driver embodying the information processing method of the present invention function on the CPU 1. The BIOS is stored in the program ROM 3b of the ROM 3, while the operating system is stored in the hard disk (HD) constituting the external memory 11.

When the power supply is turned on in the host computer 3000, the IPL (initial program loading: program for loading the operating system from the external memory into the main memory) function of the BIOS program reads the operating system from the HD to the RAM 2 whereby the functions of the operating system are initiated. The printer driver is rendered operable when an application, functioning under the management of the operating system on the host computer 3000, executes the printing operation in response to an instruction of the user, namely when the printer driver is read from a storing medium such as the external memory 11 and is loaded in the RAM 2 under the control of the operating system and the BIOS.

Figure 2:
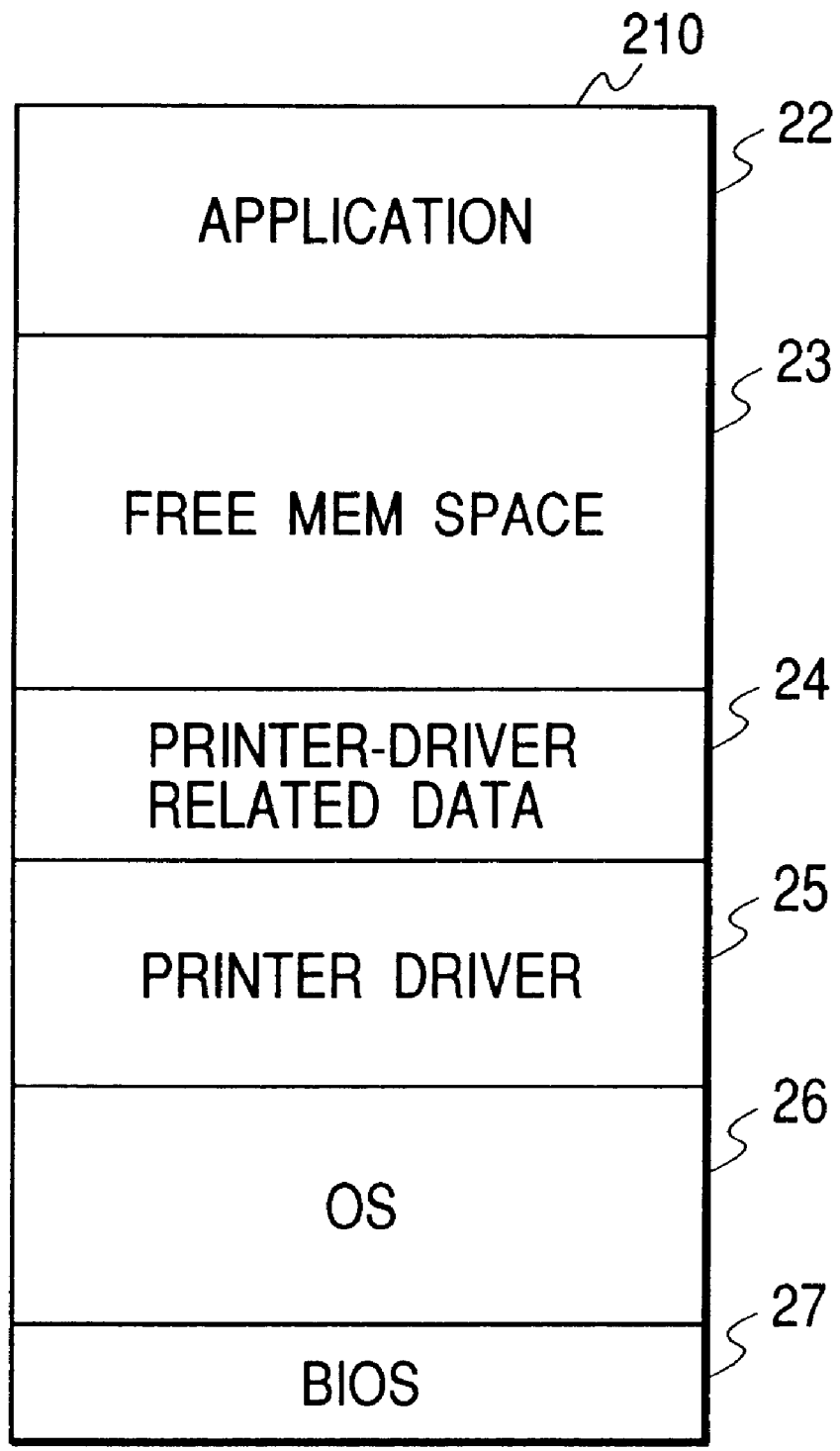
FIG. 2 is a view showing the memory map when the printer driver of the first and second embodiments of the present invention is loaded on a RAM of the host computer and is rendered executable.

FIG. 2 shows a memory map when the printer driver 25, in which the information processing method of the first embodiment is applied, is loaded in the RAM 2 of the host computer 3000 and is rendered operable, wherein an area 210 of the RAM 2 contains an application 22, an empty memory space 23, printer driver related data 24, the printer driver 25, the operating system 26 and the BIOS 27.

Figure 3:
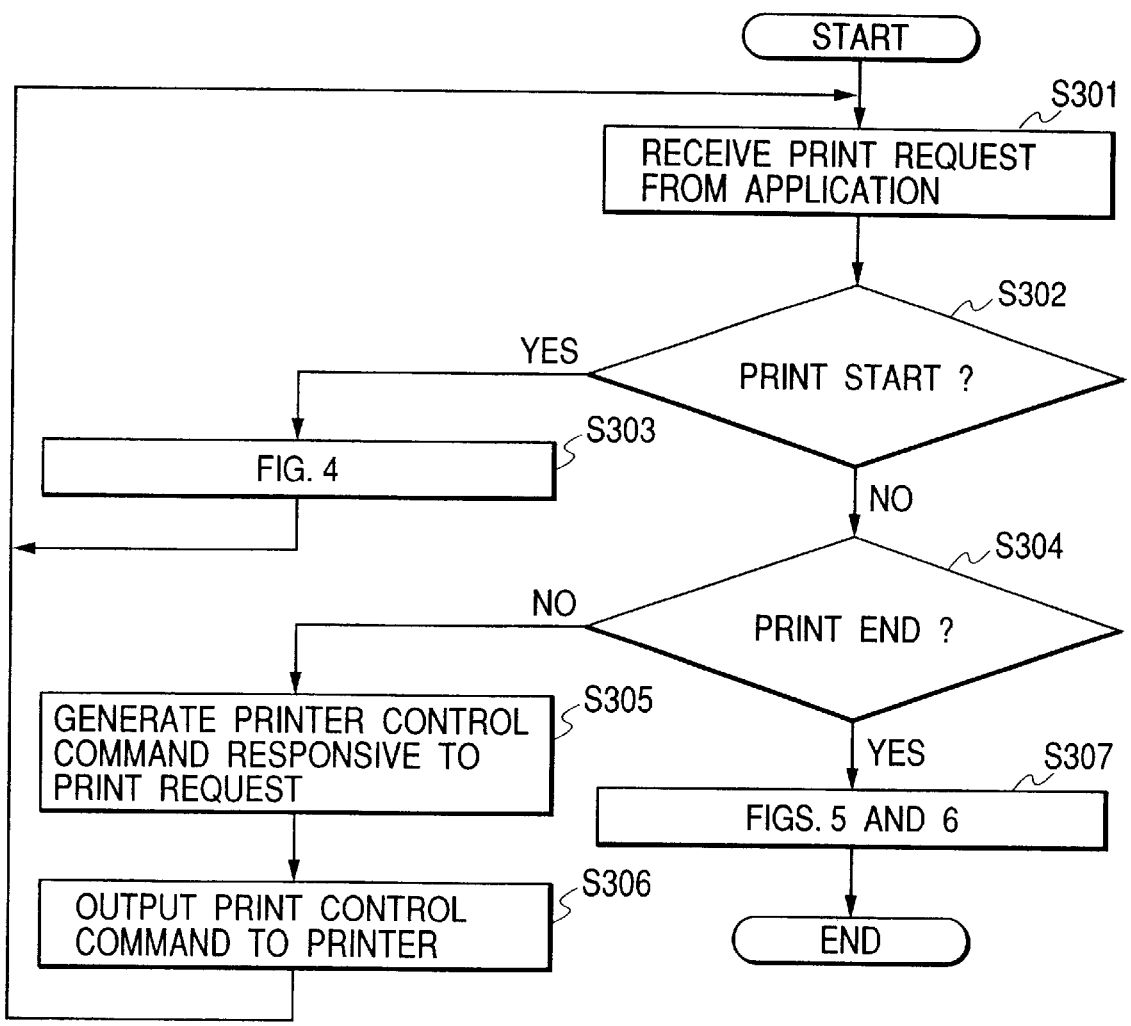
FIG. 3 is a flow chart showing the outline of a printer driver process in the first embodiment of the present invention.
Figure 4:
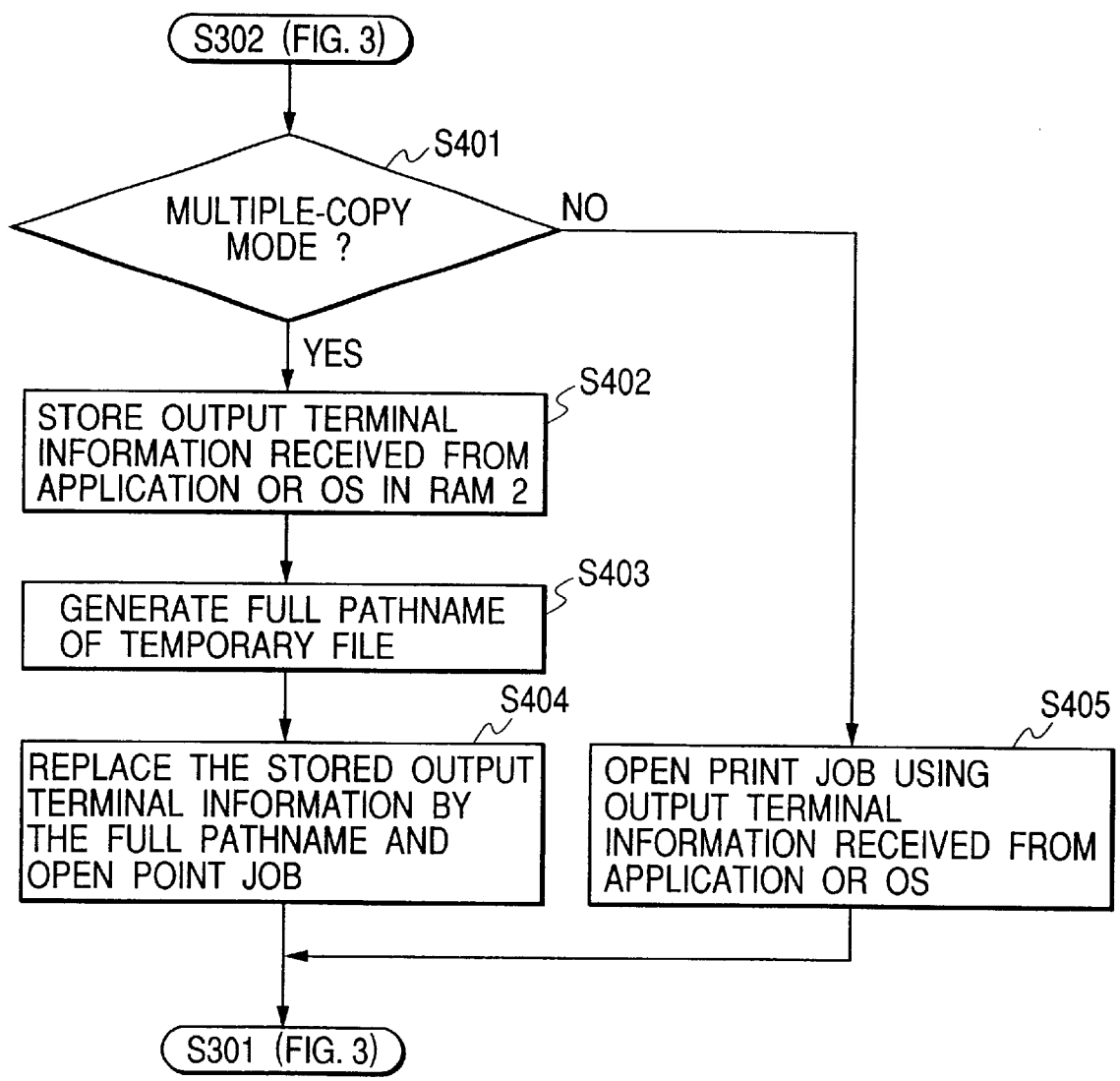
FIG. 4 is a flow chart showing the details of the printer driver process in the first embodiment of the present invention, wherein the print request from an application means the start of printing process.
Figure 5:
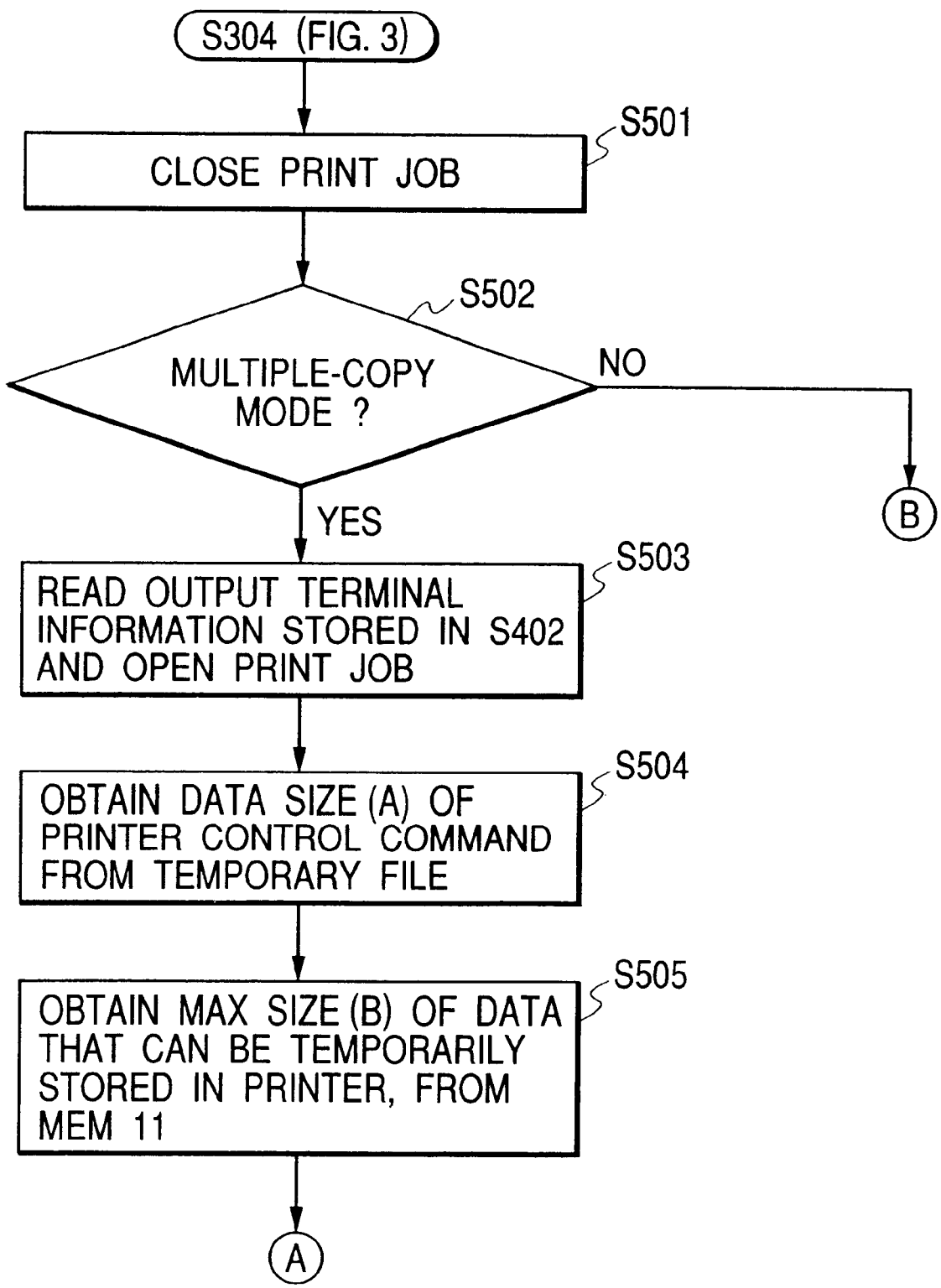
FIGS. 5 and 6 are flow charts showing the details of the printer driver process in the first embodiment of the present invention, wherein the print request from an application means the end of printing process.
Figure 6:
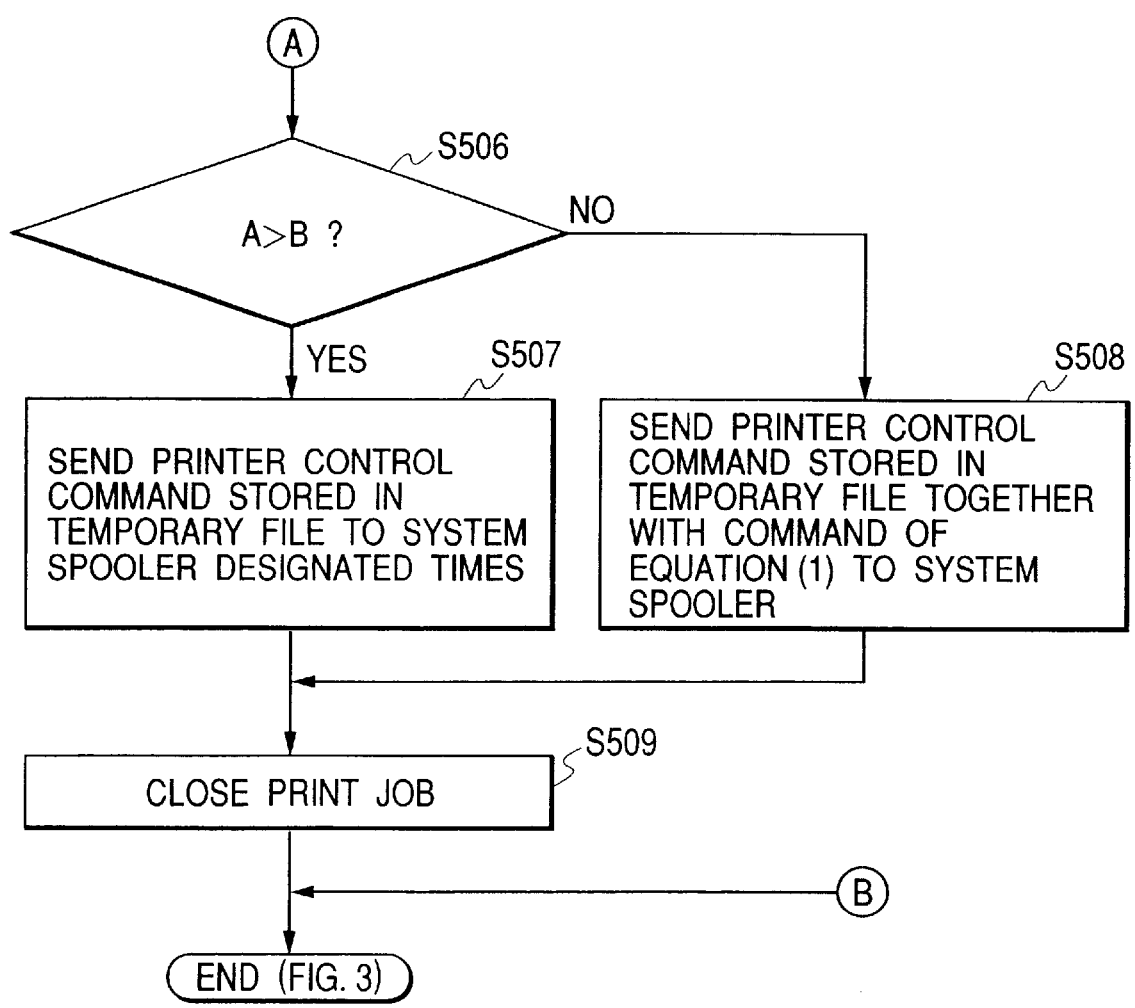

In the following there will be detailedly explained, with reference to flow charts shown in FIGS. 3 to 6, the operations of the printer driver 25 of the printer control system of the above-described first embodiment in accepting the print request from the application 22 through the operating system 26 and generating the printer control commands in succession, wherein FIG. 3 is a flow chart showing the outline of the process of the printer driver 25, FIG. 4 is a flow chart showing the content of process of a step S303 in FIG. 3, and FIGS. 5 and 6 are flow charts showing the content of process of a step S307 in FIG. 3.

Referring to FIG. 3, from the start to the end of the printing process of the application 22, the printer driver 25 continuously receives the print request from the application 22 through the operating system (step S301). At first the printer driver 25 discriminates whether the received print request indicates the start of printing (step S302), and, if so (yes in the step S302), the printer driver 25 executes a step S303 (cf. FIG. 4) and again continues to accept the print request from the application 22.

If the step S302 identifies that the print request does not means the start of printing (no in the step S302), and, if a step S304 identifies that it indicates the end of printing (yes in the step S304), the sequence proceeds to a step S307 (cf. FIGS. 5 and 6) and then the printer driver 25 terminates the process of generating the printer control command.

In case the above-mentioned steps S302 and S304 identify that the print request does not indicate the start nor the end of printing (no in the steps S302 and S304), the printer driver 25 generates printer control commands corresponding to the content of the print request (step S305), and sends the printer control commands to the printer 1500 through a system spooler managed by the operating system 26 (step S306).

In the following there will be explained in detail, with reference to FIG. 4, the printer driver process (step S303) in case the print request from the application 22 indicates the start of printing. At first the printer driver 25 discriminates whether the multiple-copy mode is designated, by referring to additional information obtained in receiving the print start request (step S401). If not designated (yes in the step S401), there is opened a printing job, based on the output destination information, including the output port name, entered from the application 22 or the OS 26 (step S405).

On the other hand, if the printer driver 25 identifies that the multiple-copy mode is designated (yes in the step S401), it stores the output destination information, entered from the application 22 or the OS 26, in the RAM 2 of the host computer 3000 (step S402) and generates a full-path name (a file name including the name of the drive and all the directories from the route) of a temporary file (a file temporarily prepared during the function of the application), utilizing a function call (calling a function by its name into the program in order to use a function subprogram) provided by the OS 26 (step S403).

Then the printer driver 25 opens the printing job by replacing the output destination information entered from the application 22 or the OS 26 with thus generated full-path name of the temporary file (step S404). All the printer control commands can be memorized in the file indicated by the designated full-path name if the printer driver 25 opens the printing job designating the full-path name of the temporary file as the output destination, utilizing the system spooler provided by the OS 26, and closes the printing job at the end of the printing operation. This is because the data output to the output destination designated at the opening of the printing job can be achieved by the system spooler in transmissive manner, by writing the data into the system spooler with an identifier (handle) acquired at the opening of the printing job.

In the following there will be explained in detail, with reference to FIGS. 5 and 6, the printer driver process (step S307 in FIG. 3), in case the print request from the application 22 indicates the end of printing. Referring to FIGS. 5 and 6, the printer driver 25, after closing the opened printing job (step S501), discriminates whether the multiple-copy mode is designated, by referring to the additional information acquired in receiving the print end request (step S502). If not (no in the step S502), the printer driver 25 terminates the process.

In case the printer driver 25 identifies the designation of the multiple-copy mode (yes in the step S502), it reads the output destination information, stored in the step S402 in FIG. 4, from the RAM 2 and opens a printing job anew based on such information (step S503). Then the printer driver 25 determines the total data size (A) of the printer control commands, stored as a temporary file, utilizing the function call of the OS 26 and stores it on the RAM 2 (step S504).

Then the printer driver 25 acquires the maximum data amount (B) which the printer 1500 can temporarily store with the job spool function, and stores such amount in the RAM 2 (step S505). In the first embodiment, the data of the above-mentioned maximum amount is stored by an exclusive application in a predetermined area of the external memory 11 in a predetermined format, and the printer driver 25 executes the process of the aforementioned step S505 by reading this information into the RAM 2 by the function call of the OS 26.

The printer driver 25 compares the total data size (A) of the printer control commands acquired in the step S504 with the maximum data memory capacity (B) acquired in the step S505 (step S506), and, if (A) is larger, outputs the printer control commands, temporarily stored in the temporary file, to the system spooler in repetition by a predetermined number of times (step S507).

On the other hand, if (B) is judged larger, the printer driver 25 outputs the printer control commands stored in the temporarily file after adding a printer control command, indicated in the foregoing (1) to the head and adding a character train indicating the end of the print data at the end (step S508). Then the printer driver 25 closes the print job newly opened in the step S503 (step S509) and terminates the process (steps S503–S509) in case the multiple-copy mode is designated.

As explained in the foregoing first embodiment, in case the multiple-copy mode is designated, the printer driver 25 embodying the information processing method of the present invention does not immediately outputs the successively generated printer control commands to the printer 1500 but temporarily stores them in the external memory 11 of the host computer 3000, then discriminates whether the total data size exceeds the maximum data size which the printer 1500 can temporarily store in the use of the job spool function, and, in case of excess, the printer driver 25 itself outputs the temporarily stored printer control commands in repetition by a predetermined number of times to the printer 1500, whereby there can be ensured the output with the sheets of the predetermined number.

The functions of the foregoing first embodiment may naturally be realized by the host computer, based on a program externally installed. Consequently the present invention can also be attained in such a case that such functions are attained by loading information, including a program into the system including the output device and the host computer from a memory medium such as a CD-ROM, a floppy disk or a flush memory, or from an external memory medium through a network such as electronic mail or personal computer communication.

In the first embodiment explained in the foregoing, the printer control system is composed of the host computer 3000 on which the printer driver 25 constituting the printer control command generating program and the printer 1500 capable of processing the data as if the data have been received by the predetermined number of times, and the host computer 3000 is provided with the external memory 11 for storing the maximum data amount of the received data which the printer 1500 can temporarily store and the printer driver 25 capable of discriminating whether the total data size of the printer control commands exceeds the maximum data amount and, in case of such excess, outputting the temporarily stored printer control commands by the designated number of times to the printer 1500, whereby it is rendered possible to resolve the drawback in the prior art that the total data size of the printer control commands exceeds the maximum data size temporarily storable in the printer, resulting from a fact that the total data size of the printer control commands generated by the printer driver is not known until the completion of the command generating process, thereby securely ensuring the output with the predetermined number of output sheets.

[2] Second embodiment

The printer control system of a second embodiment is composed of a host computer 3000, provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10 and an external memory 11; and a printer 1500 provided with a CPU 12, a RAM 19, a ROM 13, an input unit 18, a printer engine interface (I/F) 16, a disk controller (DKC) 20, a printer engine 17, an operation unit 1501 and an external memory 14 (cf. FIG. 1). The structure of the constituting units will not be explained further as they are same as in the foregoing first embodiment.

Also the memory map when the printer driver 25 of the second embodiment is loaded in the RAM 2 of the host computer 3000 and is rendered operable, namely the configuration of the application 22, empty memory space 23, printer driver related data 24, printer driver 25, operating system 26 and BIOS 27 (cf. FIG. 2) will not be explained further as it is same as in the foregoing first embodiment.

The second embodiment provides an improvement that, in the use of the job spooling function, the printer 1500 dynamically acquires the maximum data amount temporarily storable in the printer 1500 through a bidirectional interface and accordingly executes the process as explained in the foregoing first embodiment.

Figure 7:
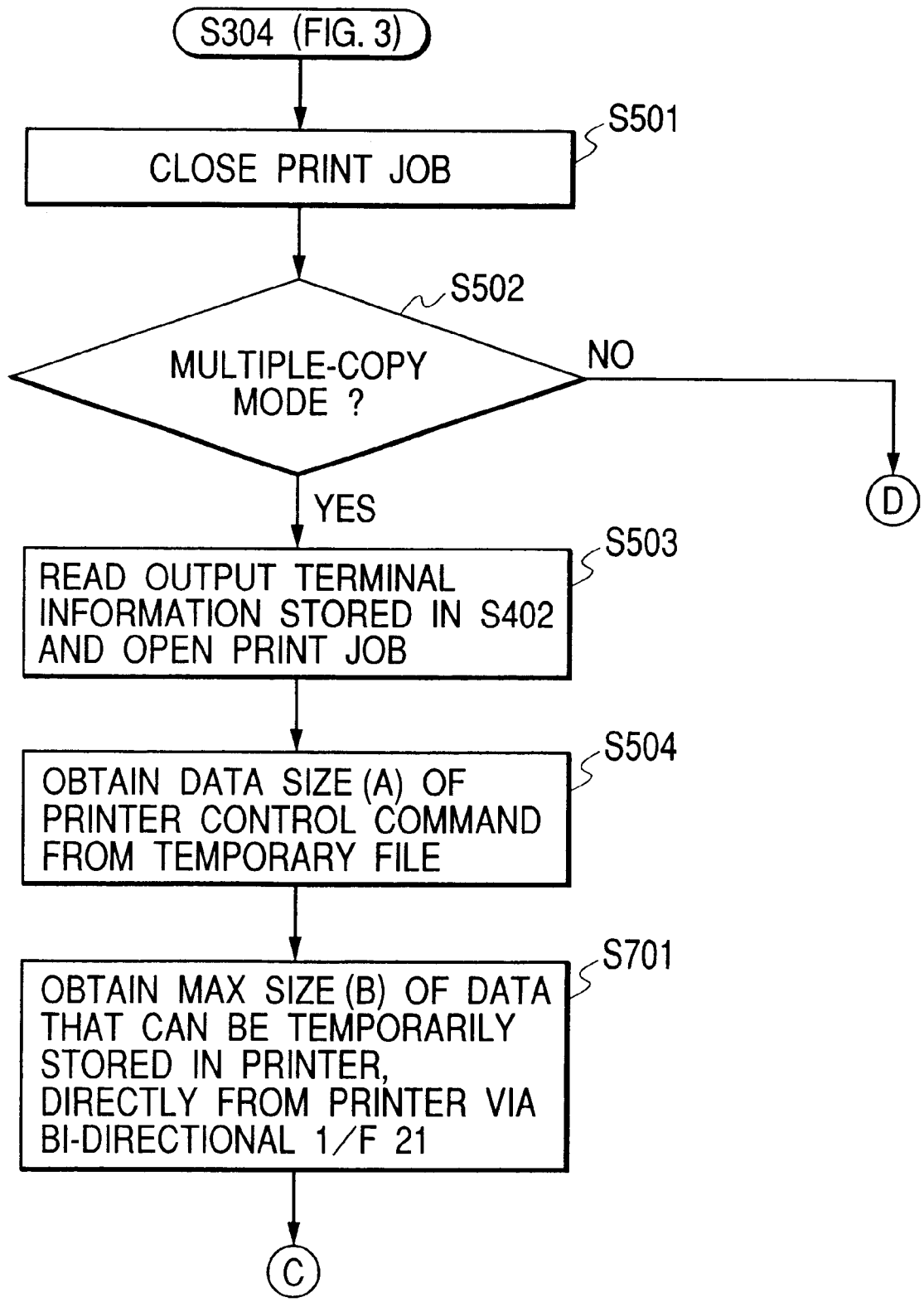
FIGS. 7 and 8 are flow charts showing the details of the printer driver process in the second embodiment of the present invention, wherein the print request from an application means the end of printing process.
Figure 8:
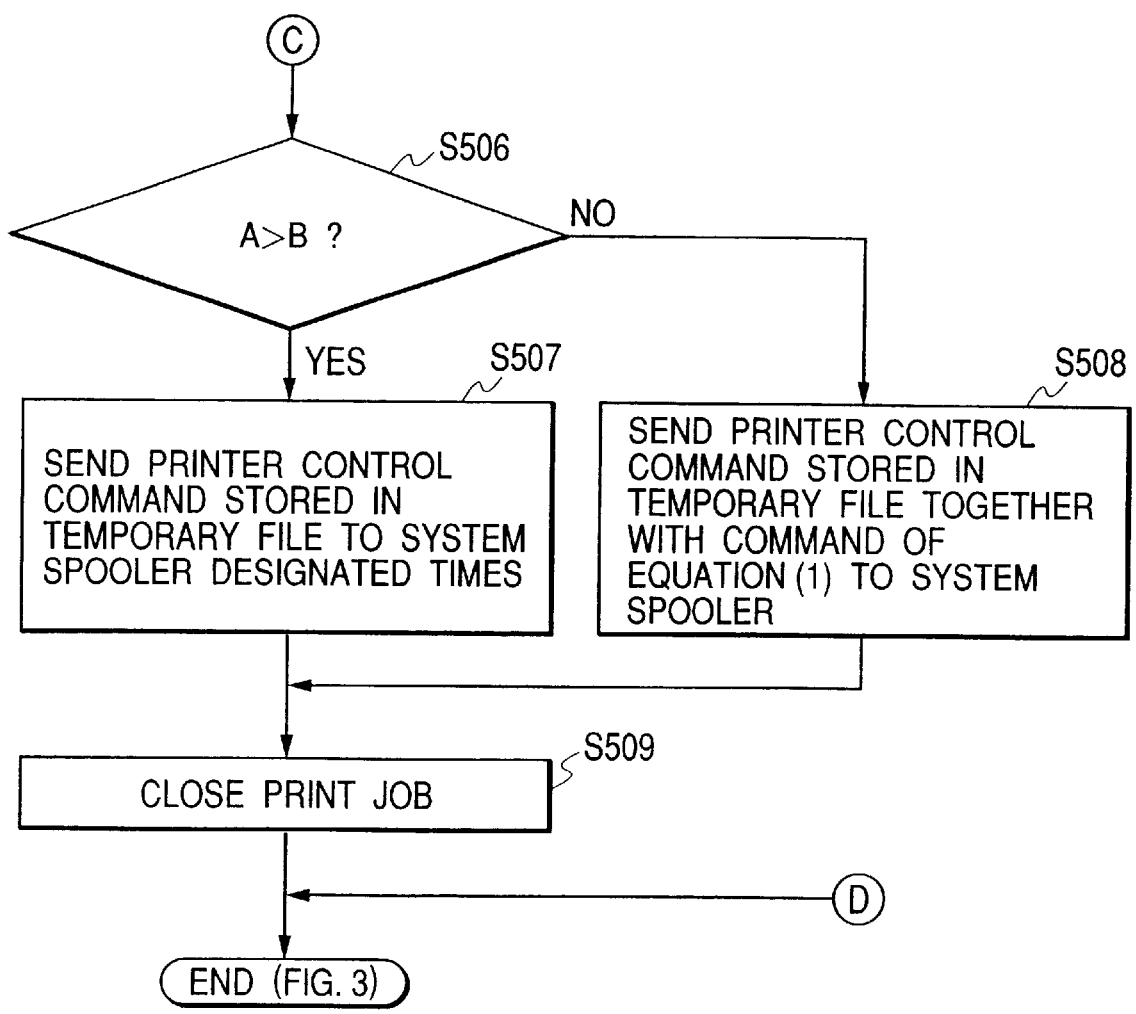

In the following there will be explained in detail, with reference to flow charts shown in FIGS. 7 and 8, the operations of the printer driver of the above-described printer control system of the second embodiment generates the printer control commands in succession by receiving the print request of the application through the operating system. FIGS. 7 and 8 are flow charts showing the content of the step S307 in FIG. 3, wherein the processes same as those in FIGS. 5 and 6 are represented by same numbers and will not be explained further.

The printer driver 25 of the second embodiment executes, instead of the step S505 in FIG. 5 of the first embodiment, a step S701 in FIG. 7. Referring to FIGS. 7 and 8, in response to the reception of the print end request from the application 22 and upon discrimination of the designation of the multiple-copy mode, the printer driver 25 executes the steps S501 to S504 as in the foregoing first embodiment and then dynamically acquires, through a bidirectional interface 21, the maximum data amount temporarily storable in the printer 1500 in the use of the job spooling function and stores it in the RAM 2 (step S701).

Then the printer driver 25 compares the maximum data amount storable in the printer 1500, acquired in the step S701, with the total data size of the printer control commands, and accordingly executes a step S507 or S508. Other processes executed by the printer driver are identical with those in the foregoing first embodiment.

In the second embodiment it has been explained that the printer driver 25 acquired the maximum data amount storable in the printer 1500 through the bidirectional communication, but such form is not restrictive. The maximum data amount mentioned above may be acquired through the network by the printer driver 25 or by an exclusive application or an exclusive process cooperating with the printer driver 25 on the host computer 3000.

The improvement shown in the second embodiment allows the printer driver 25 to always acquire the latest maximum data amount temporarily storable in the printer 1500 in the use of the job spooling function, dynamically from the main body of the printer 1500. Therefore, for example in case the aforementioned set values of the printer 1500 are changed in an unspecified timing, there can be achieved relatively exact setting of the conditions (step S506 in FIG. 8) in comparison with the information processing method of the foregoing first embodiment.

In the second embodiment explained in the foregoing, the printer control system is composed of the host computer 3000 on which the printer driver 25 constituting the printer control command generating program and the printer 1500 capable of processing the data as if the data have been received by the predetermined number of times, wherein the printer 1500 is provided with the external memory 14 for storing the maximum data amount of the received data which the printer 1500 can temporarily store while the host computer 3000 is provided with the printer driver 25 capable of discriminating whether the total data size of the printer control commands exceeds the maximum data amount acquired from the printer 1500 through the bidirectional interface 21, and, in case of such excess, outputting the temporarily stored printer control commands by the designated number of times to the printer 1500, whereby it is rendered possible to resolve the drawback in the prior art that the total data size of the printer control commands exceeds the maximum data size temporarily storable in the printer, resulting from a fact that the total data size of the printer control commands generated by the printer driver is not known until the completion of the command generating process, thereby securely ensuring the output with the predetermined number of output sheets.

Also as the printer driver always acquires, from the main body of the printer, the latest maximum data amount temporarily storable in the printer 1500 in the use of the job spooling function, there can be achieved relatively exact setting of the conditions in comparison with the information processing method of the foregoing first embodiment, even in the setting of the printer 1500 is changed in an unspecified timing.

The present invention may also be applied to a system consisting of plural equipment (for example host computer, interface devices, reader, printer etc.) or an apparatus consisting of a single equipment (such as a copying machine or a facsimile apparatus).

Also the object of the present invention can naturally be attained in a case where a memory medium storing the program codes of a software realizing the aforementioned embodiments is supplied to a system or an apparatus and the functions of the aforementioned embodiments are realized by a computer (CPU or MPU) of the above-mentioned system or apparatus by reading and executing the program codes stored in the memory medium.

In such case the program codes themselves of the software realize the functions of the aforementioned embodiments, and the memory medium storing the program codes constitutes the present invention.

The memory medium storing such program codes can be, for example, a floppy disk, a hard disk, an optical disk, a magnetooptical disk, a CD-ROM, a CR-R, a magnetic tape, a non-volatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

As explained in the foregoing, the present invention provides an information processing system provided with an upper equipment such as a computer on which a command generating program for generating print control commands is operable and a printing device such as a printer for effecting a printing operation based on the data received from the upper equipment, the system comprising command memory means for temporarily storing the print control commands, discrimination means for discriminating whether the total data size of the temporarily stored print control commands exceeds the maximum data size of the received data which can be temporarily stored in the printing device, and output means adapted, in case of excess, to output the temporarily stored print control commands by a designated number of times, whereby it is rendered possible to resolve the drawback in the prior art that the total data size of the printer control commands exceeds the maximum data size temporarily storable in the printer, resulting from a fact that the total data size of the printer control commands generated by the printing device is not known until the completion of the command generating process, thereby securely ensuring the output with the predetermined number of output sheets.

Also according to the present invention, the printing device of the information processing system includes received data memory means for temporarily storing the data received from the upper equipment and can process the received data as if such data have been received by the designated number of times, so that the output with the predetermined number of output sheets can be securely ensured.

Also according to the present invention, the upper equipment of the information processing system includes data size memory means for storing the above-mentioned maximum data size, so that there can be achieved exact discrimination whether the total data size of the print control commands exceeds the above-mentioned maximum data size.

Also according to the present invention, as the data size memory means of the information processing system is detachable from the upper equipment, the convenience of use of the memory means can be improved.

Also according to the present invention, as the above-mentioned maximum data size is stored through the user interface of the command generating program, there can be achieved exact discrimination whether the total data size of the print control commands exceeds the above-mentioned maximum data size.

Also according to the present invention, as the above-mentioned maximum data size is stored by a program module other than the command generating program, there can be achieved exact discrimination whether the total data size of the print control commands exceeds the above-mentioned maximum data size.

Also according to the present invention, the printing device of the information processing system includes data size memory means for storing the above-mentioned maximum data size while the upper equipment includes acquisition means capable of acquiring the above-mentioned maximum data size from the data size memory means, there can be achieved exact discrimination whether the total data size of the print control commands exceeds the above-mentioned maximum data size.

Also according to the present invention, as the data size memory means of the information processing system is detachable from the printing device, the convenience of use of the memory means can be improved.

Also according to the present invention, as the acquisition means of the information processing system is adapted to acquire the above-mentioned maximum data size through the bidirectional interface or through the network, there can always be ensured the output with the predetermined number of output sheets even in the information processing system connected through such bidirectional interface or network.

What is claimed is:

1. An information processing system having a host apparatus on which a command generating program for generating print control commands is operable and a printing apparatus for effecting a printing operation based on data received from the host apparatus, said system comprising:

first discrimination means, in the host apparatus, for discriminating whether a multiple-copy mode has been set;

command memory means for temporarily storing the print control commands in the host apparatus if said first discrimination means discriminates that the multiple-copy mode has been set;

second discrimination means for discriminating based on ability information of the printing apparatus whether a print process based on the print control commands stored in said command memory means can be executed by spooling print data for the print control commands in the printing apparatus; and generating means for generating print data by outputting the print control commands stored in said command memory means to the printing apparatus a designated number of times if said second discrimination means discriminates that the print process cannot be executed, and for generating print data by adding a consecutive process command to the stored print control commands, the print data being output to the printing apparatus, if said second discrimination means discriminates that the print process can be executed.

2. A system according to claim 1, wherein the ability information of the printing apparatus indicates a maximum data size of data which can be received and temporarily stored in the printing apparatus, and wherein said discrimination means compares a data size of the print control commands stored in said command memory means with the maximum data size so as to discriminate whether the print process can be executed.

3. A system according to claim 2, wherein the host apparatus includes data size memory means for storing the maximum data size.

4. A system according to claim 3, wherein said data size memory means is detachably mountable to the host apparatus.

5. A system according to claim 2, wherein the maximum data size is stored in the host apparatus through a user interface of the command generating program.

6. A system according to claim 2, wherein the maximum data size is stored in the host apparatus by a program module other than the command generating program.

7. A system according to claim 2, wherein the printing apparatus includes data size memory means for storing the maximum data size, and the host apparatus includes acquisition means for acquiring the maximum data size from said data size memory means.

8. A system according to claim 7 wherein said data size memory means is detachably mountable to the printing apparatus.

9. A system according to claim 7, wherein said acquisition means acquires the maximum data size through a bidirectional interface or a network.

10. A system according to claim 1, wherein the printing apparatus includes data memory means for temporarily storing the print data received from the host apparatus and processes the print data as if the print data have been received by the designated number of times.

11. An information processing apparatus on which a command generating program for generating print control commands is operable, said apparatus comprising:

first discrimination means for discriminating whether a multiple-copy mode has been set;

command memory means for temporarily storing the print control commands if said first discrimination means discriminates that the multiple-copy mode has been set;

second discrimination means for discriminating based on ability information of a printing apparatus whether a print process based on the print control commands stored in said command memory means can be executed by spooling print data for the print control commands in the printing apparatus; and generating means for generating print data by outputting the print control commands stored in said command memory means to the printing apparatus a designated number of times if said second discrimination means discriminates that the print process cannot be executed, and for generating print data by adding a consecutive process command to the stored print control commands, the print data being output to the printing apparatus, if said second discrimination means discriminates that the print process can be executed.

12. An apparatus according to claim 11, wherein the ability information of the printing apparatus indicates a maximum data size of data which can be received and temporarily stored in the printing apparatus, and wherein said discrimination means compares a data size of the print control commands stored in said command memory means with the maximum data size so as to discriminate whether the print process can be executed.

13. An apparatus according to claim 12, further comprising data size memory means for storing the maximum data size.

14. An apparatus according to claim 12, wherein the maximum data size is stored through a user interface of the command generating program.

15. An apparatus according to claim 12, wherein the maximum data size is stored by a program module other than the command generating program.

16. An apparatus according to claim 11, wherein said apparatus causes said generating means to generate the print data without causing said command memory means to store the print control commands, if said first discrimination means discriminates that the multiple-copy mode has not been set.

17. An information processing apparatus on which a command generating program for generating print control commands is operable, said apparatus comprising:
    first discrimination means for discriminating whether a multiple-copy mode has been set;
    a command memory arranged to temporarily store the print control commands if said first discrimination means discriminates that the multiple-copy mode has been set;
    a second discriminator arranged to discriminate based on ability information of a printing apparatus whether a print process based on the print control commands stored in said command memory can be executed by spooling print data for the print control commands in the printing apparatus; and
    a generator arranged to generate print data by outputting the print control commands stored in said command memory to the printing apparatus a designated number of times if said second discriminator discriminates that the print process cannot be executed, and for generating print data by adding a consecutive process command to the stored print control commands, the print data being output to the printing apparatus, if said second discriminator discriminates that the print process can be executed.

18. An apparatus according to claim 17, wherein the ability information of the printing apparatus indicates a maximum data size of data which can be received and temporarily stored in the printing apparatus, and wherein said discriminator compares a data size of the print control commands stored in said command memory with the maximum data size so as to discriminate whether the print process can be executed.

19. An apparatus according to claim 18, further comprising a data size memory arranged to store the maximum data size.

20. An apparatus according to claim 18, wherein the maximum data size is stored through a user interface of the command generating program.

21. An apparatus according to claim 18, wherein the maximum data size is stored by a program module other than the command generating program.

22. An apparatus according to claim 17, wherein said apparatus causes said generator to generate the print data without causing said command memory to store the print control commands, if said first discriminator discriminates that the multiple-copy mode has not been set.

23. A method carried out in an information processing apparatus on which a command generating program for generating print control commands is operable and in which a command memory is provided to store the print control commands, said method comprising:
    a first discrimination step for discriminating whether a multiple-copy mode has been set;
    a second discrimination step of discriminating based on ability information of a printing apparatus whether a print process based on the print control commands stored in the command memory can be executed by spooling print data for the print control commands in the printing apparatus; and
    a generating step of generating print data by outputting the print control commands stored in the command memory to the printing apparatus a designated number of times if said second discrimination step discriminates that the print process cannot be executed, and of generating print data by adding a consecutive process command to the stored print control commands, the print data being output to the printing apparatus, if said second discrimination step discriminates that the print process can be executed.

24. A method according to claim 23, wherein the ability information of the printing apparatus indicates a maximum data size of data which can be received and temporarily stored in the printing apparatus, and wherein said discrimination step compares a data size of the stored print control commands with the maximum data size so as to discriminate whether the print process can be executed.

25. A method according to claim 24, further comprising a step of storing the maximum data size.

26. A method according to claim 24, wherein the maximum data size is stored through a user interface of the command generating program.

27. A method according to claim 24, wherein the maximum data size is stored by a program module other than the command generating program.

28. A method according to claim 23, wherein said method causes said generating step to generate the print data without storing the print control commands in the command memory, if said first discrimination step discriminates that the multiple-copy mode has not been set.

29. A computer-readable memory medium which stores program codes for executing a method carried out in an information processing apparatus on which a command generating program for generating print control commands is operable and in which a command memory is provided to temporarily store the print control commands, said method comprising:
    a first discrimination step of discriminating whether a multiple-copy mode has been set;
    a second discrimination step of discriminating based on ability information of a printing apparatus whether a print process based on the print control commands stored in the command memory can be executed by spooling print data for the print control commands in the printing apparatus; and
    a generating step of generating print data by outputting the print control commands stored in the command memory to the printing apparatus a designated number of times if said second discrimination step discriminates that the print process cannot be executed, and of generating print data by adding a consecutive process command to the stored print control commands, the print data being output to the printing apparatus, if said second discrimination step discriminates that the print process can be executed.

30. A medium according to claim 29, wherein the ability information of the printing apparatus indicates a maximum data size of data which can be received and temporarily stored in the printing apparatus, and wherein said discrimination step compares a data size of the stored print control commands with the maximum data size so as to discriminate whether the print process can be executed.

31. A medium according to claim 30, wherein said method further comprising a step of storing the maximum data size.

32. A medium according to claim 30, wherein the maximum data size is stored through a user interface of the command generating program.

33. A medium according to claim 30, wherein the maximum data size is stored by a program module other than the command generating program.

34. A medium according to claim 29, wherein said method causes said generating step to generate the print data without storing the print control commands in the command memory, if said first discrimination step discriminates that the multiple-copy mode has not been set.

35. A computer program product comprising a computer-readable medium which stores program codes for executing a method carried out in an information processing apparatus on which a command generating program for generating print control commands is operable and in which a command memory is provided to temporarily store the print control commands, said method comprising:

compute readable program code for a first discrimination step of discriminating whether a multiple-copy mode has been set;

second computer readable program code for a discrimination step of discriminating based on ability information of a printing apparatus whether a print process based on the print control commands stored in the command memory can be executed by spooling print data for the print control commands in the printing apparatus; and computer readable program code for a generating step of generating print data by outputting the print control commands stored in the command memory to the printing apparatus a designated number of times if said second discrimination step discriminates that the print process cannot be executed, and of generating print data by adding a consecutive process command to the stored print control commands, the print data being output to the printing apparatus, if said second discrimination step discriminates that the print process can be executed.

36. A computer program product according to claim 35, wherein the ability information of the printing apparatus indicates a maximum data size of data which can be received and temporarily stored in the printing apparatus, and wherein said discrimination step compares a data size of the stored print control commands with the maximum data size so as to discriminate whether the print process can be executed.

37. A computer program product according to claim 36, wherein said method further comprising a step of storing the maximum data size.

38. A computer program product according to claim 36, wherein the maximum data size is stored through a user interface of the command generating program.

39. A computer program product according to claim 36, wherein the maximum data size is stored by a program module other than the command generating program.

40. A computer program product according to claim 35, wherein said method causes said generating step to generate the print data without storing the print control commands in the command memory, if said first discrimination step discriminates that the multiple-copy mode has not been set.

* * * * *

UNITED STATES PATENT AND TRADEMARK OFFICE
CERTIFICATE OF CORRECTION

PATENT NO. : 6,496,279 B2
DATED : December 17, 2002
INVENTOR(S) : Yoshinobu Kuroi It is certified that error appears in the above-identified patent and that said Letters Patent is hereby corrected as shown below:

Column 1,
Lines 18 and 22, "such" should read -- such a --.

Column 3,
Line 12, "such" should read -- such a --.

Column 6,
Line 3, "detailedly" should read -- in detail --;
Line 24, "means" should read -- specify --; and
Line 43, "there is opened a printing job" should read -- a print job is opened --.

Column 7,
Line 42, "temporarily" should read -- temporary --.

Column 8,
Lines 40, 47 and 62, "same" should read -- the same --; and
Line 61, "same" should read -- are the same --.

Column 10,
Line 9, "such" should read -- such a --.

Column 15,
Line 28, "compute" should read -- computer --.

Signed and Sealed this

Fifteenth Day of July, 2003

JAMES E. ROGAN
*Director of the United States Patent and Trademark Office*